Patented Apr. 24, 1923.

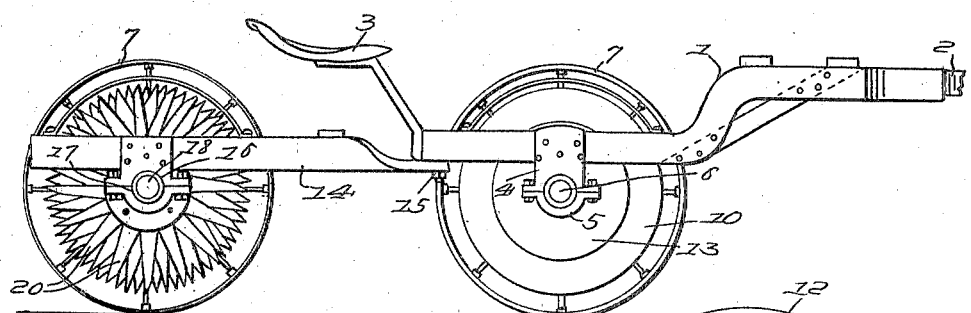

1,453,208

UNITED STATES PATENT OFFICE.

NATHEN DANIEL THOMAS, OF JACKSONVILLE, FLORIDA.

SCARIFIER.

Application filed March 27, 1922. Serial No. 547,150.

*To all whom it may concern:*

Be it known that I, NATHEN D. THOMAS, citizen of the United States, residing at Jacksonville, in the county of Duval and State of Florida, have invented certain new and useful Improvements in Scarifiers, of which the following is a specification, reference being had therein to the accompanying drawing.

This invention relates to improvements in combined scarifiers and emulsifiers for use in straight cutting and pulverizing soil.

The primary object of the invention is to provide a machine for cutting and pulverizing the sod and turf so that the soil may be further pulverized by a harrow mechanism after it is thoroughly cut up into blocks or sections.

Another object of the invention is to provide an improved apparatus, including a mechanism for cutting the soil into strips or blocks and provided with an attachment for pulverizing the soil after it has been cut into strips or blocks. In the apparatus the block cutter may be employed with or without the soil pulverizer as the machine is made in two sections and the pulverizer may be readily detached if desired.

Another object is to furnish a machine that is readily transportable and in which the ground treating elements are elevated out of contact with the ground when the machine is being transported.

With the foregoing objects outlined, and with other objects in view which will appear as the description proceeds the invention consists in the novel features hereinafter described in detail, illustrated in the accompanying drawing and more particularly pointed out in the appended claims.

In the drawing:

Figure 1 is a side view of the improved apparatus with the right hand wheels removed for the purpose of clearness.

Fig. 2 is a rear view of the machine.

Fig. 3 is a vertical sectional view of one of the disk cutters employed in scarifying the soil.

Fig. 4 is a side view of the same.

Fig. 5 is a side view of one of the pulverizing star-shaped cutters.

Fig. 6 is a vertical sectional view of the same.

In the drawing 1 designates the front frame of the machine from which extends the pole 2 to which the horses are attached. The frame is provided at its rear end with an operator's seat 3 and carries depending brackets 4 (only one of which is shown) provided with bearings 5 in which is journaled an axle 6 provided at its outer ends with supporting wheels 7 that are detachably secured by any suitable means such as nuts 8. The portion of the axle between the bearings 5 is of rectangular cross-section in order to pass through square apertures 9 in the circular cutting disks 10. From an inspection of Fig. 3 it will be seen that the opposite sides 11 of each disk 10 are tapered toward the outer edge 12 of the disk so that when the cutter enters the soil a wedge-shaped incision will be made. Bearing collars 13 are arranged on the opposite sides of each disk and form spacing members between adjacent disks, so that the disks will be separated a predetermined distance along the axle 6. From Fig. 5 it will be seen that eight of these disks are arranged side by side in spaced relation on the axle 6 and when the wheels 7 are detached from the machine and said machine is drawn over the soil, the edges of the disks will enter the soil and form parallel cuts therein as the machine proceeds across the field. After the soil or turf is cut in one direction the machine may be drawn over the same in a direction at right angles to the first cuts and thus the soil will be cut into blocks. This prepares the soil for pulverization and any suitable form of pulverizer may then be drawn over the soil to properly prepare the same for cultivation without plowing, as the cutters in effect do the work ordinarily accomplished by a plow.

For the purpose of pulverizing the soil I have provided an attachment for the machine consisting of a frame 14 detachably connected to the rear end of the frame 1 by any suitable means such as a bolt and nut 15. The side bars of the frame 14 are provided with depending brackets 16 carrying bearings 17 in which is journaled a shaft 18. The ends of the shafts 18 are also supported by wheels 7 secured in place by nuts 8. Mounted on the shaft 18 is a series of star-shaped pulverizing cutters 19, one of which is shown in detail in Figures 5 and 6. It will be seen that each cutter 19 comprises a series of radially arranged cutter blades 20, and spacing collars 21 are arranged on the opposite sides of each pulverizing disk for the purpose of suitably spacing the same on the shaft 18. It will be noted that the opposite sides of each blade 20 are tapered as shown at 22 and the front and rear surfaces 23 of each blade are also tapered so that a point 24 is provided at the end of each blade. When the attachment is secured to the frame 1 the blades 20 function to cut the blocks of soil up into fine particles so that the soil will be pulverized by the passage of the machine thereover.

In Figure 2 it will be noted that in the present construction seven pulverizing wheels are arranged on the shaft 18 and these wheels are arranged in alignment with the spaces between the cutters 10 so that the pulverizing cutters will act on the portion of the soil which lies between the incisions made by the disks 10.

It is preferred during the operation to detach the pulverizer when the soil is first treated and then the operator cross-cuts the field to form blocks in the soil. Then the rear part or attachment is secured to the end of the frame 1 and the field is again cross-cut to permit the pulverizer to tear up the turf and pulverize the soil.

With the two parts or two sections of the machine working together, the roots that are impossible to cut or turn over with a harrow are cut into small sections or pieces and pulverized by the straight cutters acting in conjunction with the pulverizing cutters. With the present machine the circular cutters and pulverizing elements cut down into the soil to a depth of about eight inches, and when the field is cross-cut and pulverized in the manner above set forth a harrow can be dragged across the field and all of the roots that have been cut under the ground can be dragged out and the soil soon cleared of hard rooted grasses that cannot be gotten rid of in other ways.

From the foregoing, it is believed that the construction, operation and advantages of the invention may be readily understood, and I am aware that various changes may be made in the details disclosed without departing from the spirit of the invention as expressed in the following claims.

What I claim and desire to secure by Letters-Patent is:

1. An apparatus of the class described comprising a frame carrying an axle, a series of cutting disks arranged on said axle in spaced relation, a shaft mounted in the frame and arranged rearwardly of said axle, a series of star-shaped pulverizing cutters arranged on said shaft in spaced relation, and detachable supporting wheels of greater diameter than said cutting disks mounted on said axle.

2. An apparatus of the class described comprising a frame carrying an axle, a series of cutting disks arranged on said axle in spaced relation, a shaft mounted in the frame and arranged rearwardly of said axle, and a series of star-shaped pulverizing cutters arranged on said shaft in spaced relation, said frame being formed of front and rear sections, the rear section being detachably connected to the front section, and the rear section being mounted on said shaft.

3. An apparatus of the class described comprising a frame carrying an axle, a series of cutting disks arranged on said axle in spaced relation, a shaft mounted in the frame and arranged rearwardly of said axle, a series of star-shaped pulverizing cutters arranged on said shaft in spaced relation, and detachable supporting wheels mounted on the ends of said shaft.

4. An apparatus of the class described comprising a main frame having depending brackets, an axle journaled in said brackets, supporting wheels detachably connected to the ends of said axle, a series of circular cutting disks arranged side by side on said axle and each disk being of less diameter than the supporting wheels, collars arranged on the sides of the disks and spacing each disk from adjacent disks, an auxiliary frame detachably connected to the main frame, a wheel supported shaft supporting said auxiliary frame, and a series of star-shaped wheels provided with radially arranged cutting blades mounted on said shaft in spaced relation, said star-shaped wheels being arranged in alignment with the spaces between said circular disks.

In testimony whereof I hereunto affix my signature in the presence of two witnesses.

NATHEN DANIEL THOMAS. [L. S.]

Witnesses:
J. H. DELCHER,
N. M. POWELL.